May 18, 1954  B. J. SCHILL  2,678,708
OVERRUNNING CLUTCH MECHANISM
Filed Sept. 16, 1948  4 Sheets-Sheet 1
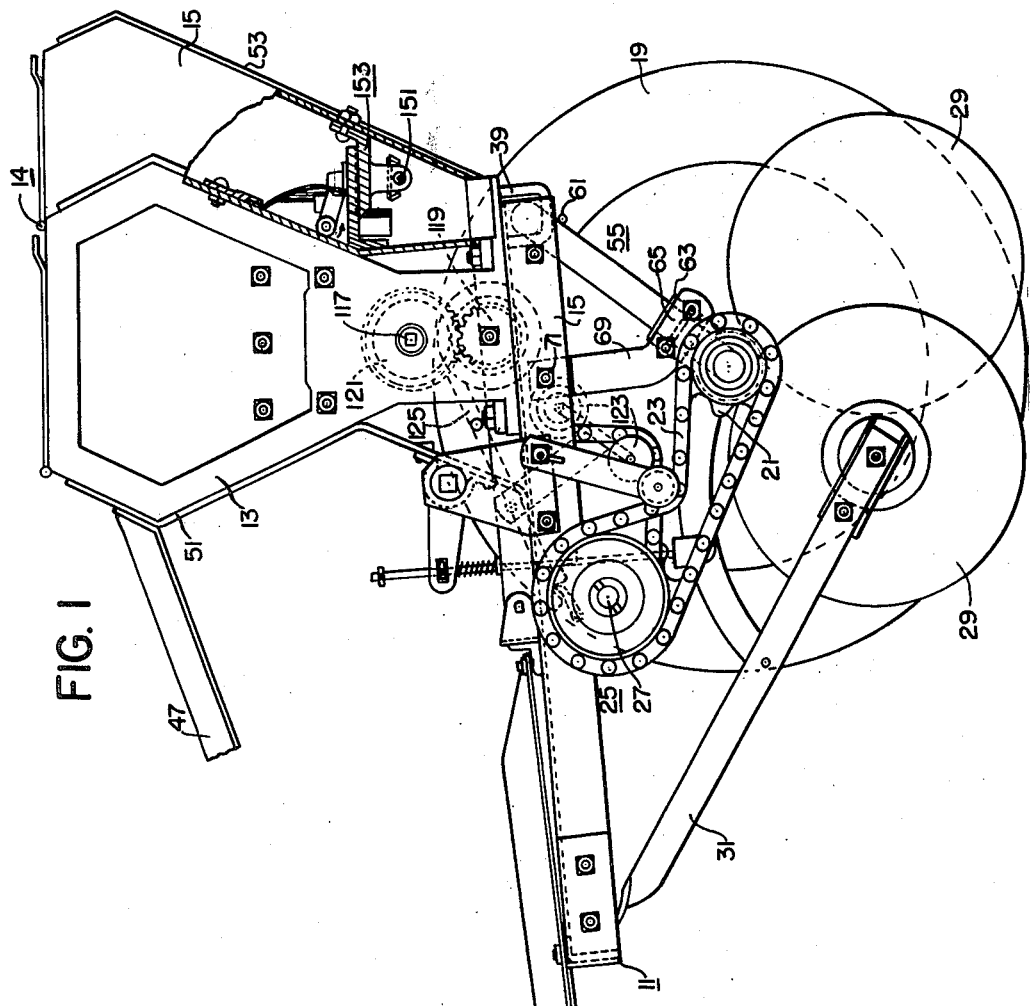
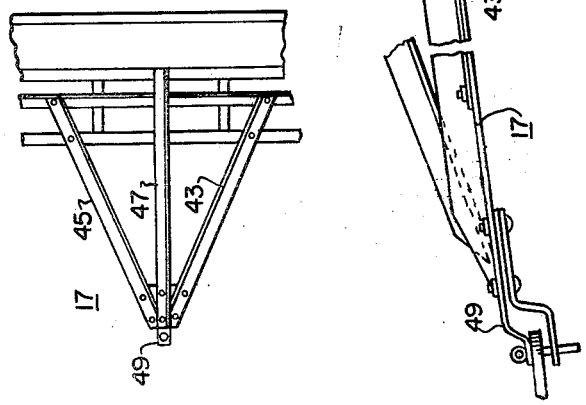
INVENTOR.
BERNARD J. SCHILL
BY Soans, Pond, Anderson
ATTORNEYS May 18, 1954. B. J. SCHILL 2,678,708
OVERRUNNING CLUTCH MECHANISM
Filed Sept. 16, 1948 4 Sheets-Sheet 2
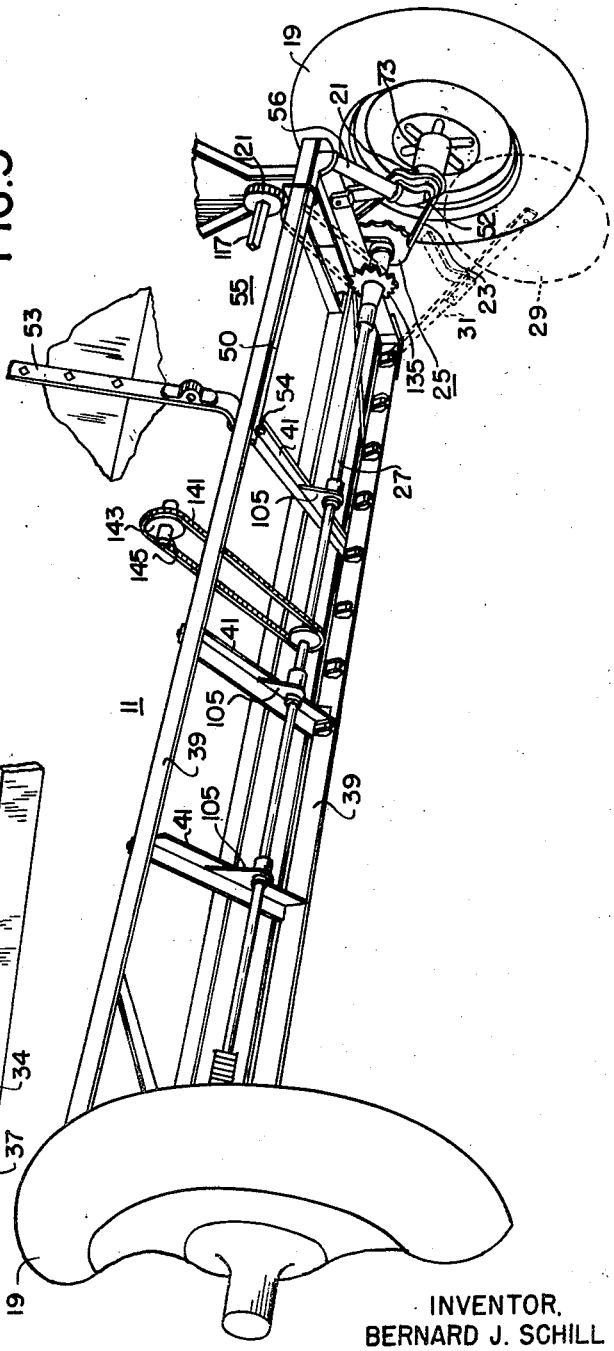
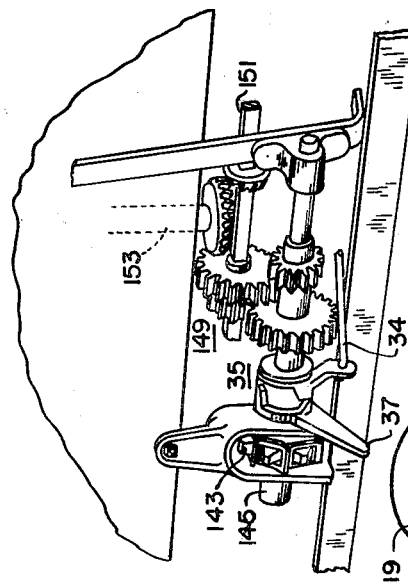
INVENTOR.
BERNARD J. SCHILL
BY *Souna Pond, & Anderson*
ATTORNEYS May 18, 1954   B. J. SCHILL   2,678,708
OVERRUNNING CLUTCH MECHANISM Filed Sept. 16, 1948   4 Sheets-Sheet 3

INVENTOR.
BERNARD J. SCHILL

BY Soans, Pond, Anderson

ATTORNEYS

May 18, 1954
B. J. SCHILL
2,678,708
OVERRUNNING CLUTCH MECHANISM
Filed Sept. 16, 1948
4 Sheets-Sheet 4
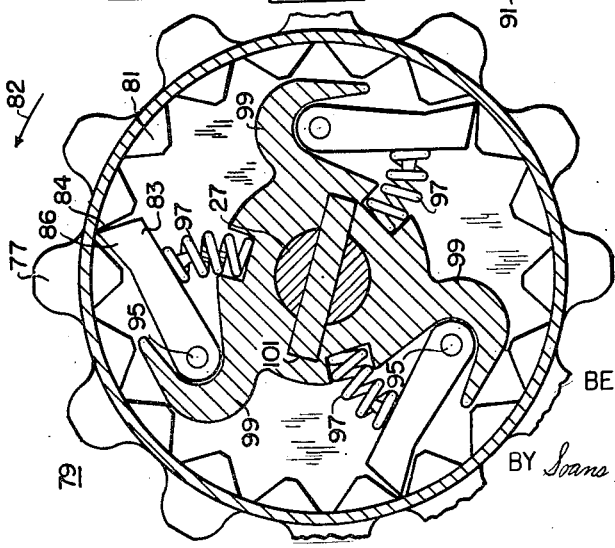
INVENTOR.
BERNARD J. SCHILL
BY Soans Pond, Anderson
ATTORNEYS Patented May 18, 1954

2,678,708

UNITED STATES PATENT OFFICE 2,678,708

OVERRUNNING CLUTCH MECHANISM

Bernard J. Schill, Rockford, Ill., assignor to J. I. Case Company, Racine, Wis., a corporation of Wisconsin Application September 16, 1948, Serial No. 49,603

2 Claims. (Cl. 192—46)

The present invention relates, in general, to farm equipment, and more particularly to an improved drive-clutch arrangement especially adapted for use with a combination fertilizer-grain drill and like apparatus.

In the more common types of fertilizer-grain drills, the seed and fertilizer feeder arrangements are operated through inter-related drive mechanisms directly connected to one of the grain drill support wheels; and as a result, the amount of seed tendered into the furrows is directly proportional to the speed of such driver-support wheel. It is well known that when a vehicle progresses in a turning movement the outer wheel of the vehicle, relative to the turn, will advance more rapidly than the inner wheel. It is apparent therefrom that whenever a drill is deviated from its normal straight-line seeding course, the speed of the support wheels will vary, and accordingly, in drills of the more common type, will vary the amount of seed distributed at such point of deviation.

Since it is common practice, in certain parts of the country, to plant grain in the fall of the year while the fields may be obstructed at irregular intervals, as by standing corn shocks, a type of fertilizer-grain drill has been developed which will distribute a substantially uniform quantity of seed independent of the variable wheel speeds occasioned as the drill is maneuvered over an irregular planting pattern. However, the driving means utilized for the seed and fertilizer feeder mechanism of this latter type drill, prior to this invention, have invariably been of a rather complex design, and the drill structure accompanying such driving means was necessarily of like complexity. As a result, the original drill assembly costs were excessive and additionally, difficult maintenance problems were presented whenever repairs were required.

It is an object of this invention, therefore, to provide an improved fertilizer-grain drill which shall overcome the disadvantages and deficiencies of the prior structures. More particularly it is an object of the invention to provide an improved drive means for grain drills of the subject type.

As will hereinafter appear, this object is accomplished by the provision of a novel drive-clutch adapted to transmit power from the drill support wheels to the working elements of the drill. The various details and important novel features of the drive-clutch and the fertilizer-grain drill of the invention will become apparent upon reference to the drawings, specification, and claims enclosed herewith.

In the drawings:

Fig. 1 is a fragmentary, side view of a grain drill provided with a novel drive clutch mechanism in accordance with the invention;

Fig. 2 is a fragmentary, top plan view of the triangular drawbar attached to the drill;

Fig. 3 is a fragmentary, bottom, prespective view, which illustrates certain features of the drive means for the seeder and fertilizer feeder mechanisms;

Fig. 4 is a detailed illustration of the gear train which operates the fertilizer feeder mechanism;

Fig. 6 is an end sectional view taken along line 6—6 of Fig. 7; and

Figure 7 is an elevational view of the drive clutch with parts broken away and in section to more clearly illustrate the structural arrangement.

Figure 5:
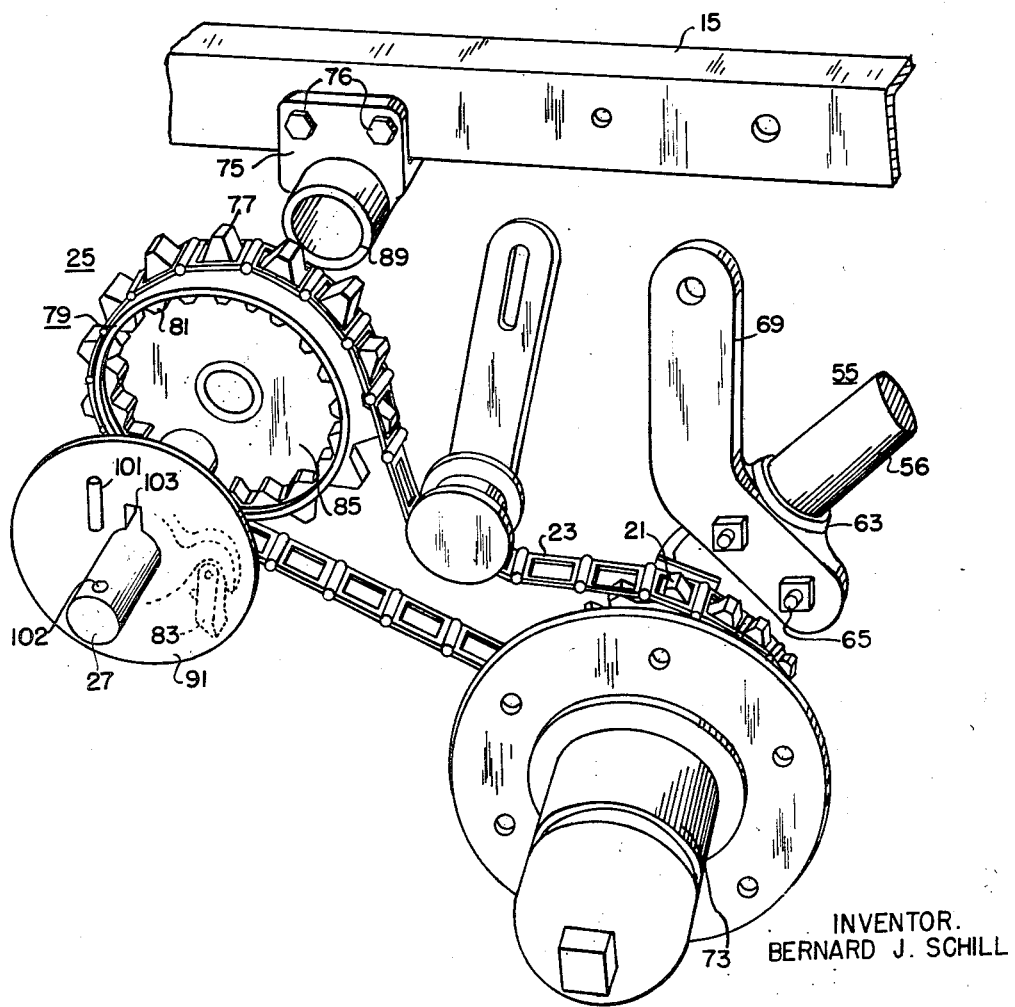
Fig. 5 illustrates an exploded, perspective view of the clutch mechanism associated with the left-hand support wheel.

The illustrated structure includes a frame 11 mounting a sheet metal seed and fertilizer hopper 14 having individual compartments 13 and 15 for separately retaining the seed and fertilizer therein while the planting operation is being performed. A triangular drawbar 17 extends forward from the frame to form attachment means for connecting the drill to an associated draft vehicle. Frame 11 and its associated structure are supported by a pair of standard, small sized, pneumatic tire wheels 19, which in their rotational movement over the ground, effect simultaneous rotation of the sprockets 21 attached to their individual hubs. A chain 23 cooperates with each of the sprockets 21 to operatively connect an overrunning drive clutch 25 to the associated support wheel for selectively controlling operation of a jack shaft 27. Each of the drive clutches 25 is of novel construction and constitutes an important feature of the invention, as will hereinafter appear.

Seed and fertilizer feeding mechanism which determine the amount of grain and fertilizer to be distributed and the time of such distribution, are driven by means of inter-related gear trains and clutch mechanisms connected to the jack shaft 27. The drive clutches 25 are keyed to the respective ends of the jack shaft 27, the shaft being normally operated responsive to rotation of the drive-clutch pair as the drill wheels progress along a comparatively straight-line seeding path. However, whenever the drill is deviated from such course in a turning movement, one wheel will obviously rotate more rapidly than the other, whereupon the overrunning drive clutch associated with the slower moving wheel is arranged to disengage its driving member and allow the faster moving wheel to independently drive the jack shaft and its associated mechanism.

The seed and fertilizer feeder arrangements are of conventional type and are intended to be connected to a plurality of chutes, not shown, each chute extending from the hopper bottom portion to a point adjacent the disc type furrow openers 29, which are pivotally supported on dragbars 31 extending downwardly from the frame. Selective metering means (not shown) which are associated with the feed gates of the seeder and fertilizer arrangements, and selective speed arrangements associated therewith operate to determine the quantity of grain and fertilizer to be distributed. Controls extending forward from the drill to a point adjacent the operator are operative to raise and lower the furrow openers to any desired depth, and a lift bar arrangement, likewise controlled by the operator, is operative to bias the furrow openers into and out of engagement with the soil, as desired. These arrangements are well known in the art and are not shown. Control links 32 and 34 extend from the lift bar mechanism to a pair of clutches 33 and 35 (Figs. 4 and 7), operation of the lift bar mechanism simultaneously actuating the clutches 33 and 35 through the action of the links 32 and 34 to terminate the distribution of grain seed and fertilizer whenever the furrow openers are disengaged from ground contact, and to initiate the seeding and fertilizer distribution whenever the furrow openers are biased into the ground. The fertilizer mechanism is also equipped with a hand throw lever 37, which, when operated to a predetermined position, disengages the fertilizer feed mechanism to thereby effect an independent seeding operation. Suitable covering mechanism, not shown, such as chains or rollers, are provided to cover the seeds as deposited in the furrow.

Referring to Figs. 1 and 3, the illustrated grain drill structure comprises a rectangularly-shaped base frame 11, including a plurality of transverse frame members 39, comprising conventional angled, structural sections which are interconnected by a plurality of short, longitudinally extending, stiffening members 41. A pair of horizontally angled, structural elements 43 and 45 (Fig. 2) are fastened to the front portion of the frame 11, and a vertically angled, stiffening element 47 is attached to the forward surface of the metal feed hopper 13 by suitable fastening means. The forward ends of the structural elements 43, 45, and 47 are rigidly bolted to a face plate disposed at their forward ends thus to define the triangularly shaped drawbar 17, and a hitch post 49 is attached to the forward end of the drawbar so formed.

The combination grain-fertilizer hopper structure 14 is connected to the frame, fore and aft, by suitable brackets 51 and 53. On the feed hopper face, a set of braces 51 conform to a portion of the face contour and extend downward to the frame 11, bolt means connecting the braces 51 to the frame and hopper. The rearward face of the hopper is strengthened by a set of braces, such as the braces illustrated at 53, which conform to the hopper contour and which are connected both to the frame 11 and to the inner end of the wheel support axles 50 as by the bolts 54 shown in Fig. 3.

It will be noted that the braces 51 and 53 are bolted to the frame and to the sheet metal hopper 14, which is desirably constructed of fairly heavy gauge material. The hopper 14 includes metal divisions and an upwardly curved bottom, and thus possesses the characteristics of a hollow beam of considerable rigidity, which in cooperation with the rectangular frame aids in providing an extremely strong and durable implement. Additionally, the lower end of each of the two outer hopper braces 53 is bolted both to the frame 11 and to the inner end of one of the wheel supporting axles 50. This arrangement materially strengthens the structure and aids in preventing misalignment of the control shaft and the interrelated gear mechanism.

As previously described, each end of the drill frame 13 is supported on a standard, small size, pneumatic tire wheel 19, which is journaled on a depending axle construction 55, the axle being angled so as to provide a desirable clearance between the frame 11 and the ground level for installation of grain chutes and furrow openers 29. As more clearly illustrated in Figs. 1, 3, and 5, the axle construction comprises a bent shaft having two spaced-apart, generally parallel sections 50 and 52 joined by an integral right-angled connecting portion 56 which lies in the plane of the two spaced-apart parallel sections. The longer of the two parallel sections 50 is adapted to be connected to the rear transverse frame member 39, and the brace 53 by a single bolt 54, or other suitable fastening means, and the shorter length 52 is provided with a journal for mounting the support wheel 19, such journal supporting section being disposed below the rear frame 39 substantially as illustrated in Fig. 3.

The connecting portion 56 (as shown in Fig. 5) is attached to the outermost frame longitudinal stiffening member 15 by means of a hook clamp 61, whose arcuate section encompasses the perpendicular connecting section of the axle and whose threaded shank is bolted into the stiffening member 15. The connecting portion 56 of the axle is angled downwardly and forward, and lies substantially in the plane of the outer frame member 15 so as to minimize torsional force applied to the frame. Experience indicates that the angle should be within the range of from about 40 to 60°, the angle being determinative of the amount of shock absorbed by the direct compression of the connecting portion 56 when the drill is subjected to use on rough fields.

A supporting bracket 63 which comprises an integral casting is attached to the axle at the junction of the wheel supporting section of the shaft 52 and the connecting portion 56. An annular flange on the bracket serves as a sandcap for the wheel bearing, the inner annular bearing surface thereof being adapted to absorb inward thrust from the wheel 19 during operation of the implement. Connecting flanges on the bracket allow attachment thereto of the bracing member 69, which extends upward to the outer stiffening member 15.

The inner portion of the bracket 63 is shaped to the contour of the bend forming the wheel supporting or journal section 52 and the connecting portion 56 of the axle, and the connecting flanges of the bracket are drilled with suitable holes for receiving the shanks of a U-bolt 65, which encompasses the connecting portion 56 of the shaft and attaches the bracket thereto. The bracing member 69 is a generally, vertically extending, flat steel strap, which is drilled for connection to the clamping portion of the bracket 63, and the axle by the threaded legs of the U-bolt 65, as illustrated. The upper end of the bracing member is provided with a knee or offset section, which is adapted to engage the lower surface of the stiffening member 15. The upper end of the bracing member 69 is attached to the frame member 15 so that the weight of the implement is borne by the off-set section of the bracing member.

The support wheel 19 includes a hub or bearing section 73 of greater diameter than the journal section to allow insertion of a pair of roller bearings and a spacing ring (not shown) therebetween. Structural details of the bearing, as well as other details of the grain drill disclosed herein, are illustrated in my co-pending application, Serial No. 751,714, which was filed on June 2, 1947, now Patent Number 2,641,510 which issued June 9, 1953.

Each support wheel hub 73 carries a sprocket 21, operatively connected to one of the drive-clutch mechanisms 25 by means of a suitable chain 23. Each drive-clutch 25 is rigidly supported by an individual support bearing 75, the drive-clutch being composed basically of a main gear 79 and a gear face plate 91, each of said drive-clutches 25 being effective at times to transmit driving power from the drill support wheels to a jack shaft 27 for operating the drill seed and fertilizer arrangements connected thereto. In more detail, the hollow main gear 79 comprises an outer flange rim having a set of gear teeth 77 which are integral with its outer periphery and integral inner gear teeth 81 on the inner periphery thereof. The teeth 81 are shaped for operative engagement with the angled surfaces of pawl members 83 which are supported on the face plate 91. The gear face 85, located on the frame side of the main gear 79, is formed integral with the outer flange rim which mounts the dual gear tooth segments, and as more clearly illustrated in Fig. 7, locates a center-bored, bearing stem or boss 87. The outer circumference of the bearing stem 87 is designed for bearing engagement with the inner circumference of the bearing support member 75. The main gear wheel rotates with and about the bearing stem 87 as rotational movement is imparted thereto by the associated chain 23, hub sprocket 21 and support wheel 19. The outer face plate 91 is fashioned to rest within the recess formed by the inner gear tooth segment 81 and the outer rim of the main gear 79, and this plate carries a center-bored cylindrical stem 93, which fits within the bore of the main gear stem or boss 87 with a bearing fit. Thus when the face plate stem 93 is inserted within the main gear stem 87, both the face plate 91 and the main gear 79 may be rotated with and about their individual stems, independent of each other and the support bearing 75 which mounts them. A suitable lubricant receiving means 94, having communication with the interior of the support bearing, is provided in the outer surface of the bearing 75 (Fig. 7).

Each pawl member 83 has a sharp-angled face 84 and a shallow-angled face 86 at its outer end, both faces approximating the shape of the indentations formed between the gear teeth 81. The pawls are pivotally mounted about studs 95 fastened on the face plate 91, and are normally encouraged to a position directionally outward of the face plate center by associated springs 97. Therefore, the pawl members, because of their shape and their location relative to the inner gear teeth 81, are normally forced into operative engagement with the indentations between such teeth by the springs 97, substantially as shown in Fig. 6. Arcuate finger projections 99, which are cast integral with the face plate 91, encompass the lower extremities of each pawl to form a limited bearing surface for accepting forward thrust components of the pawl member and transmitting such motion to the face plate and associated jack shaft 27, the face plate 91 being keyed thereto by a key 101 located in a recessed keyway 103 (Fig. 5). The outer face of the arcuate fingers 99 form a bearing surface with the gear teeth 81, which is desirable whenever the jack shaft 27 and the face plate 91 rotate at a greater velocity than the main gear 79 as hereinafter described.

In operation, as the inner gear teeth 81 move in a counter-clockwise direction, as shown by the arrow 82 in Fig. 6, upon actuation of the main gear 79 by the chain drive 23 and the associated support wheel 19, the pawls 83 are maintained in engagement with the inner gear teeth 81 by the spring elements 97 to thus carry the pawls 83 along in their counter-clockwise, rotational movement. Pawls 83 transmit the pressure thrust to the arcuate fingers 99 to cause like movement of the face plate 91 and the jack shaft 27 keyed thereto. The clutch 25 on the opposite end of the shaft functions in a similar manner, and as the drill progresses over a fairly regular path, the clutches will act concurrently to motivate the jack shaft. However, whenever the drill is deviated from its normal path, as for example in a turning moment, the inner wheel, relative to the turn, will travel at a slower speed than the outer wheel of such turn. The outer wheel, which has a greater velocity, thus imparts its movement to its associated drive clutch 25, the pawls 83 of which will remain in engagement with the integral inner gear teeth 81 to drive the jack shaft 27 at a similar speed of rotation in a manner heretofore described. The face plate 91 associated with the clutch 25 of the inner wheel of the turn, because of its keyed connection to the jack shaft 27, will rotate at jack shaft speed, and the pawl members 83, because of its shallow angle face 86, will slip over the tooth segment 81 of the slower moving main gear. The face plate 91 and main gear 79 of the drive clutch associated with the slower moving wheel are thus independently rotated about their individual bearing stems at different speeds.

It will be noted that the outer rim of the main gear 79 extends beyond the inner tooth segment 81 to form a recess for receiving face plate 91, the flange and plate cooperatively affording protection against entry of foreign substances within the drive clutch bearings.

The seed feeder mechanism in the particular apparatus illustrated in Fig. 1 is driven from a square shaft 117 and a combination sprocket and gear 119 supported at the end of the hopper 14. The gear section of the combination gear and sprocket 119 mesh with a gear 121 on the seeder drive shaft 117 and the sprocket section is operatively connected to the jack shaft 27 by chain 125 and a spring clutch 115 (Fig. 7). Suitable idlers and chain tighteners 123 are provided for chain 125. Whenever spring clutch 115 is actively engaged with the cam piece 111, movement of the jack shaft will operate the seeder shaft and the conventional type feeder mechanism which is attached to the seeder shaft at regular intervals.

The forward face of the spring clutch 115 locates notched teeth 127 which engage similar teeth formations on the rearward face of the cam member 111, normal engagement of these teeth being effected by a coil spring 129 which is disposed about the jack shaft 27, between key 131 and the rear face of the spring clutch 115. Consequently, when the clutch 115 is in the driving position, movement of the jack shaft imparts rotation to the clutch and the sprocket sets 133 and 135 located on the clutch outer periphery to drive the associated chain 125 and the seed feeder shaft 117.

A control link 32 extends between the lift bar arrangement (not shown) and the clutch arm 137. Whenever the furrow openers 29 are raised by operation of the lift bar, the control link 32 moves the clutch arm 137 into contact with an angled projection 139 located on the support bearing 75, whereby the arm 137 and its associated cylindrical body are moved laterally against the spring clutch 115 to overcome the pressure of spring 129. Clutch 115 is thereby disengaged from the rotating cam element 111, and rotation of the clutch and its associated sprockets 133 and 135 is terminated. Operation of the furrow lift bar mechanism to bias the furrow openers 29 into the ground allows the arm 137 to return to the illustrated position, and the spring clutch 115 engages cam 111 responsive to the pressure of spring 129. The pair of sprockets 133 and 135 mounted on the clutch are used interchangeably with chain 125, the selected sprocket being determinative of the speed at which the seed metering shaft is to operate.

In assembly, the support bearings, such as 105 (Fig. 3), are spaced at regular intervals along the shaft and the spring clutch 115, the gear wheels 79, face plates 91 and the support bearings 75, are placed on their respective jack shaft ends. Key 101 (Fig. 5) is inserted into the jack shaft bore 102 and the face plate 91 is positioned so that the key 101 is received by recess 103, whereby the outer face of the face plate 91 will be located in a plane parallel with the jack shaft end. Main gear 79 is moved into engagement with the face plate 91, the stem of the face plate 91 being cooperatively inserted within the bore of the main gear stem 87, and support bearing 75 is then positioned to receive and support the outer circumference of the main gear stem 87. Cam piece 111 (Fig. 7), the inward face of which bears a tooth segment for cooperating with a like surface located on spring clutch 115, is thereupon keyed to the jack shaft by key 113 to retain the drive clutch elements in their assembled positions. It is obvious that the keys 101 and 113 will prevent lateral movement of the drive clutch on the shaft. The support bearings 75 are then attached to the frame member 15, after which the spring clutch 115 may be moved into active engagement with cam 111 and keyed to the jack shaft 27 by key 131.

Jack shaft 27 also cooperates with a chain linkage 141 which extends to the main sprocket wheel 143 of the fertilizer grain drill mechanism, as shown in Figs. 3 and 4, to provide simultaneous operation of the fertilizer drive shaft 145 therewith. A link member 34 connected to the furrow lift bar mechanism is operated in a manner similar to that of the seed feeder link member 32; that is, as the furrow openers 29 are engaged with the ground, the link member 34 operates clutch 35 to effect connection of the gear mechanism 149 to the shaft 145. Whenever the furrow openers 29 are disengaged from ground contact, the lift arm returns to its normal position to disengage the fertilizer grain mechanism 149 from the shaft 145. A hand-throw out clutch allows the operator to disengage the fertilizer grain mechanism 149 from the shaft 145, as desired, operation of the link mechanism and furrow opener lift bar thereafter being ineffective to operate the fertilizer feeder shaft 151. Conventional type feeder elements, such as 153, are attached at regularly spaced intervals along the shaft 151 and operated responsive to operation of the shaft.

It is obvious that the novel clutch drive of the invention, because of its simple design, may be readily adapted to other types of machine implements. The simple and sturdy structure of the disclosed arrangement facilitates rapid assembly of the clutch and the implement used therewith. Further, the desirable design of the drive clutch, as set forth, insures free access to the various interrelated working mechanisms of the associated implement for adjustment and repair purposes. Various features of the invention believed to be novel will become more apparent by reference to the following claims.

I claim:

1. In an overrunning clutch mechanism of the type described a driven hollow main gear including a gear face, a peripheral flange rim mounted on the periphery of said face and having a groove in the outermost end of said flange rim, outer gear teeth on the outer peripheral face of said flange rim, inner gear teeth on the inner face of said flange rim, said outer and inner gear teeth being substantially co-planar, a center bored shaft connected to and supporting said gear face and extending axially therefrom, an overrunning clutch means comprising a gear face plate disposed in the groove provided in said flange rim of said main gear, a center bored stem connected to said face plate extending within and supporting the center bored shaft on said main gear, a plurality of pawls pivotally mounted on said face plate generally co-planar with said inner gear teeth, said pawls having ends engaged with said inner gear teeth, a plurality of arcuate fingers fixedly mounted on said face plate, each of said fingers being disposed adjacent the pivot point of a pawl and having a portion extending between the inner gear teeth and a side edge of the adjacent pawl for supporting said pawl when said overrunning clutch means is positively driven by said main gear, a jack shaft fixed to said gear face plate and extending through and supporting said center bored stem on said gear face plate, and a hollow stub bearing surrounding and supporting said center bored shaft on said main gear, whereby the forces applied to said main gear and transmitted to said overrunning clutch means are generally co-planar and the center bored shaft on said main gear and the center bored stem on said face plate are internally supported by said jack shaft and externally supported by said stub bearing.

2. In an overrunning clutch mechanism of the type described comprising a driven hollow main gear including a gear face, a peripheral flange rim mounted on the periphery of said face in laterally extending relation to one side thereof and having a groove in the outermost end of said flange rim, outer gear teeth on the outer peripheral face of said flange rim, inner gear teeth on the inner face of said flange rim, said outer and inner gear teeth being substantially co-planar, a center bored shaft connected to and supporting said gear face and extending axially therefrom in a direction opposite said flange rim, an overrunning clutch means comprising, a gear face plate disposed in the groove provided in said flanged rim of said main gear, a center bored stem connected to said face plate extending within and supporting the center bored shaft on said main gear, a plurality of pawls pivotally mounted on said face plate generally co-planar with said inner gear teeth, said pawls having ends engaged with said inner gear teeth, a plurality of arcuate fingers fixedly mounted on said face plate, each of said fingers being disposed adjacent the pivot point of a pawl and having a portion extending between the inner gear teeth and a side edge of the adjacent pawl for supporting said pawl when said overrunning clutch means is positively driven by said main gear, a jack shaft fixed to said gear face plate and extending through and supporting said center bored stem on said gear face plate, and a hollow stub bearing adjacent said main gear face surrounding and supporting said center bored shaft on said main gear, whereby the forces applied to said main gear and transmitted to said overrunning clutch means are generally coplanar and the center bored shaft on said main gear and the center bored stem on said face plate are internally supported by said jack shaft and externally supported by said stub bearing.

References Cited in the file of this patent

UNITED STATES PATENTS

| Number | Name | Date |
|---|---|---|
| 121,649 | Meyers | Dec. 5, 1871 |
| 363,007 | Shanks et al. | May 17, 1887 |
| 374,757 | Riley | Dec. 13, 1887 |
| 394,085 | Summers | Dec. 4, 1888 |
| 665,047 | Armitage | Jan. 1, 1901 |
| 1,480,351 | Sang | Jan. 8, 1924 |
| 1,615,534 | Cassel | Jan. 25, 1927 |
| 1,656,831 | Rohlfsen | Jan. 17, 1928 |
| 2,143,121 | Cox | Jan. 10, 1939 |
| 2,395,576 | Moroney | Feb. 26, 1949 |